United States Patent
Honjo (10) Patent No.: US 8,250,239 B2
(45) Date of Patent: Aug. 21, 2012

(54) NETWORK SERVER, MEDIA FORMAT CONVERSION METHOD AND MEDIA FORMAT CONVERSION SYSTEM

(75) Inventor: Ryoki Honjo, Kanagawa (JP)

(73) Assignee: Sony Corporation, Tokyo (JP)

(*) Notice: Subject to any disclaimer, the term of this patent is extended or adjusted under 35 U.S.C. 154(b) by 163 days.

(21) Appl. No.: 12/729,712

(22) Filed: Mar. 23, 2010

(65) Prior Publication Data

US 2010/0268765 A1    Oct. 21, 2010

(30) Foreign Application Priority Data

Apr. 20, 2009   (JP) ................................. 2009-102102

(51) Int. Cl.
*G06F 15/16* (2006.01)
(52) U.S. Cl. ...................................................... 709/246
(58) Field of Classification Search .................. 709/203, 709/246
See application file for complete search history.

(56) References Cited

U.S. PATENT DOCUMENTS

| | | | |
|---|---|---|---|
| 2005/0198679 A1* | 9/2005 | Baran et al. ..................... | 725/88 |
| 2009/0235317 A1* | 9/2009 | Igarashi ........................... | 725/82 |
| 2010/0332565 A1* | 12/2010 | Al-Shaykh et al. ............ | 707/912 |

FOREIGN PATENT DOCUMENTS

JP        2008-61150        3/2008

* cited by examiner

*Primary Examiner* — Larry Donoghue
(74) *Attorney, Agent, or Firm* — Oblon, Spivak, McClelland, Maier & Neustadt, L.L.P.

(57) ABSTRACT

An network server includes a receiving unit that receives content from a client apparatus connected via a network, a conversion determining unit that obtains metadata of the content to determine whether to convert the media format of the content according to the metadata, and selects the media format after conversion according to the metadata, and a format converting unit that converts the media format of the content into the media format selected by the conversion determining unit.

9 Claims, 8 Drawing Sheets

NETWORK SERVER, MEDIA FORMAT CONVERSION METHOD AND MEDIA FORMAT CONVERSION SYSTEM

BACKGROUND OF THE INVENTION

1. Technical Field

The invention relates to a network server, a media format conversion method and a media format conversion system. More particularly, the invention relates to a network server that converts the media format of content, a media format conversion method and a media format conversion system.

2. Description of the Related Art

Recently, research into a network server, which records content such as television broadcasting on a recording medium and outputs the recorded content via a network, has been actively conducted. The network server can not only output the recorded content via an HDMI (High-Definition Multimedia Interface) cable and the like, but can also output the recorded content to a display apparatus via various home networks. The home networks, for example, include DLNA (Digital Living Network Alliance, registered trademark)-defined networks.

When a TS (Transport Stream) packet is transmitted via a home network, a method is available in which an apparatus of a transmission-side adds a time stamp to the TS packet, and a receiver controls the timing, at which the TS packet is output to a decoder, by using the time stamp added to the TS packet. For example, there have been disclosed various technologies for adding a time stamp to a TS packet (for example, refer to Japanese Unexamined Patent Application Publication No. 2008-61150).

SUMMARY OF THE INVENTION

However, even if a network server outputs content to a display apparatus via a network, a case may occur in which the display apparatus may not appropriately process the received content due to the existence of various media formats.

In view of the above issues, it is desirable to provide a novel and modified network server having a superior compatibility with the output via a network, a media format conversion method and a media format conversion system.

According to an embodiment of the invention, there is provided a network server including a receiving unit that receives content from a client apparatus connected via a network, a conversion determining unit that obtains metadata of the content to determine whether to convert the media format of the content according to the metadata, and selects the media format after conversion according to the metadata, and a format converting unit that converts the media format of the content into the media format selected by the conversion determining unit.

The conversion determining unit may obtain the metadata from the client apparatus on the assumption that the receiving unit receives the content.

The network server may further include a delivery unit that delivers the content received from the client apparatus or the content converted by the format converting unit to a display apparatus connected via a network.

The network server may further include a media format information storage unit that stores information on a priority of a media format after conversion, and the conversion determining unit may select a media format after conversion based on the priority.

When the media format of the content has no time stamp, the conversion determining unit may select a media format with a time stamp added thereto as a media format after conversion.

The client apparatus may communicate with the receiving unit via a DLNA-defined network, and the conversion determining unit may determine whether to convert the media format based on protocol information designated by an input argument of a CDS:CreateObject request transmitted from the client apparatus.

The receiving unit may obtain data of the content according to an HTTP POST request transmitted from the client apparatus.

According to another embodiment of the invention, there is provided a media format conversion method including the steps of obtaining metadata of content from a client apparatus connected via a network to determine whether to convert the media format of the content according to the metadata, and selecting a media format after conversion according to the metadata, receiving the content from the client apparatus, and converting the media format of the content to the selected media format.

According to further another embodiment of the invention, there is provided a media format conversion system including: a network server including a receiving unit that receives content from a client apparatus connected via a network, a conversion determining unit that obtains metadata of the content to determine whether to convert the media format of the content according to the metadata and selects the media format after conversion according to the metadata, and a format converting unit that converts the media format of the content into the media format selected by the conversion determining unit; the client apparatus that transmits the content to the network server via a network; and a display apparatus that receives delivery of the content or content, which is converted by the format converting unit, from the network server via a network.

According to an embodiment of the invention as described above, it is possible to provide a network server having a superior compatibility with the output of content via a network, a media format conversion method and a media format conversion system.

DESCRIPTION OF THE PREFERRED EMBODIMENTS

Hereinafter, a preferred embodiment of the invention will be described in detail with reference to the accompanying drawings. Further, in the present specification and drawings, the same reference numerals are used to designate the same elements having substantially the same functions in order to avoid redundancy.

Furthermore, the description will be given in order of the following items.

1. Configuration of Media Format Conversion System according to one embodiment of the Invention
2. Configuration of Network Server according to one embodiment of the Invention
3. Further Detailed Configuration of Network Server according to one embodiment of the Invention
4. Configuration of Client Apparatus that uploads content to Network Server according to one embodiment of the Invention
5. Configuration of Display Apparatus that receives delivery of content from Network Server
6. Detailed Example of Hardware configuration of Network Server according to one embodiment of the Invention
7. Base Technology of Network Server and Client Apparatus
8. Flow of Media Format Conversion in Network Server according to one embodiment of the Invention
9. Information Flow between Network Server and Client Apparatus in Media Format Conversion Work
10. Treatment of Metadata in Network Server 100

<1. Configuration of Media Format Conversion System According to One Embodiment of the Invention>

The media format conversion system according to one embodiment of the invention, for example, includes a network server 100, a client apparatus 200 and a display apparatus 300. The network server 100 obtains data of content from the client apparatus 200 via a network 10 which will be described later. Further, the network server 100 delivers the content to the display apparatus 300 via a network 11 which will be described later. The client apparatus 200 uploads data of content to the network server 100 via the network 10. The display apparatus 300 receives delivery of the content from the network server 100 via the network 11 to display the content.

The network 10, for example, includes an HDRL (HD Recording Link)-defined home network and the like. Further, the network 11, for example, includes a DLNA (Digital Living Network Alliance)-defined home network and the like. The network 10 and the network 11 are not limited thereto. For example, the network 10 and the network 11 may include other networks.

<2. Configuration Example of Network Server According to One Embodiment of the Invention>

Figure 1:
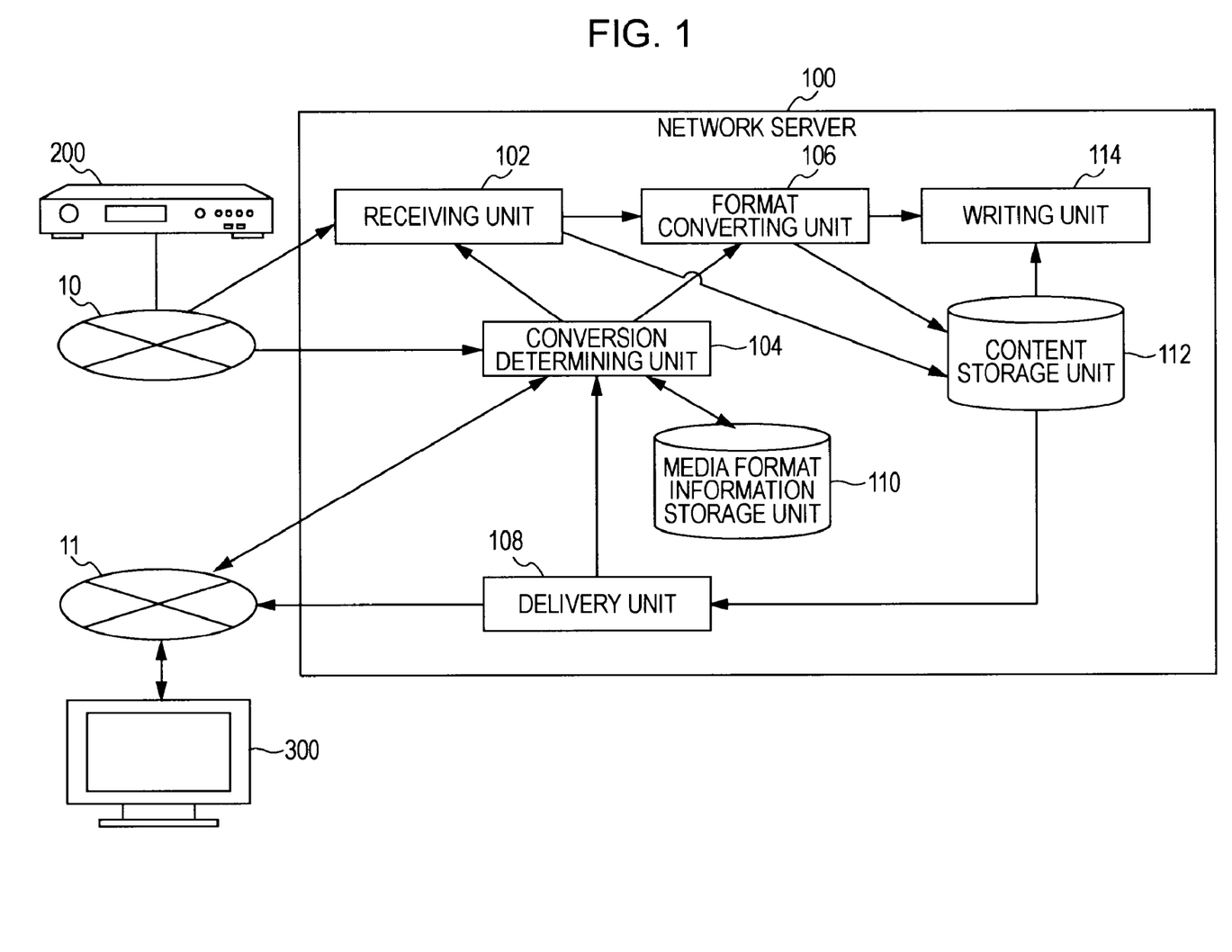
FIG. 1 is a block diagram illustrating a detailed configuration example of a network server according to one embodiment of the invention.

FIG. 1 is a block diagram illustrating a detailed configuration example of the network server 100 according to one embodiment of the invention. The network server 100, for example, includes a receiving unit 102, a conversion determining unit 104, a format converting unit 106, a delivery unit 108, a media format information storage unit 110, a content storage unit 112 and a writer 114. Processing performed by each unit is performed by hardware or programs executed by a CPU.

The receiving unit 102 receives data of content, which is obtained from a broadcast wave by a stream receiving unit 202 in the client apparatus 200, from the client apparatus 200 via the network 10. The receiving unit 102 provides the format converting unit 106 with the data of the content, which is received from the client apparatus 200, according to the determination result of the conversion determining unit 104. The receiving unit 102 may cause the data of the content received from the client apparatus 200 to be stored in the content storage unit 112.

The conversion determining unit 104 obtains metadata of content from the client apparatus 200 via the network 10 on the assumption that the receiving unit 102 receives the data of the content from the client apparatus 200. The conversion determining unit 104 determines whether to convert the media format of the content according to the obtained metadata. Further, the conversion determining unit 104 selects the media format of content after conversion according to the obtained metadata. The conversion determining unit 104 transmits the determination result to the receiving unit 102, the format converting unit 106 and the like. The conversion determining unit 104 may obtain metadata from protocol information (Mime-type and Profile-name) designated by an input argument of a CDS:CreateObject request transmitted from the client apparatus. Further, when the uploading of content is requested by an HTTP POST request from the client apparatus 200, the conversion determining unit 104 may obtain a Mime-type from a Content-Type header. Further, the conversion determining unit 104 may obtain a Profile-name from a contentFeatures.dlna.org header.

The format converting unit 106 converts the media format of the content, which is received from the client apparatus 200, into the media format selected by the conversion determining unit 104. The format converting unit 106 provides the content after conversion to the content storage unit 112 and the writer 114.

The delivery unit 108 delivers the content received in the receiving unit 102 from the client apparatus 200, the content converted by the format converting unit 106, or the content stored in the content storage unit 112 to the display apparatus 300 connected via the network 11. At this time, the delivery unit 108 may cause content to be stored in the content storage unit 112, read content stored in the content storage unit 112 according to the stored sequence, and deliver the read content to the display apparatus 300. Further, the delivery unit 108 temporally may store content in a buffer and the like and then deliver the content to the display apparatus 300. Further, the delivery unit 108 may deliver content to the display apparatus 300 by using an HDMI cable and the like through a connection method excluding the use of the network 11.

The media format information storage unit 110 stores information on a media format calling for media format conversion and information representing a priority of a media format after conversion, and provides the information to the conversion determining unit 104. In relation to the information representing the priority of the media format after conversion, it is preferred to give a high priority to a media format with a superior compatibility by taking a decoding function of the display apparatus 300 into consideration. For example, a high priority may be given to an MPEG-2 TS (Moving Picture Experts Group 2-Transport Stream) format rather than an H.264/AVC (Audio/Video Codec) format. Further, a high priority may be given to an MPEG-2 TTS format rather than an MPEG-2 TS format.

Furthermore, the media format information storage unit 110 may store a program to allow the operations of the conversion determining unit 104, the format converting unit 106 and the delivery unit 108 to be performed by software processing.

When the conversion determining unit 104 determines media format conversion to be necessary and the format converting unit 106 performs the media format conversion, the content storage unit 112 stores converted content. Further, when the conversion determining unit 104 determines the media format conversion to be unnecessary, the content storage unit 112 stores the content, which is received in the receiving unit 102 from the client apparatus 200, as it is.

The writer 114 can obtain the data of the content converted by the format converting unit 106 from the format converting unit 106, and write the data on a recording medium. Further, the writer 114 can write the data of the content stored in the content storage unit 112 on the recording medium. Herein, the recording medium includes a disk-shaped recording medium such as a DVD (Digital Video Disc) or a Blu-ray disc.

<3. Further Detailed Configuration of Network Server According to One Embodiment of the Invention>

Next, the further detailed configuration of the network Server according to one embodiment of the invention will be described with reference to FIG. 2.

Figure 2:
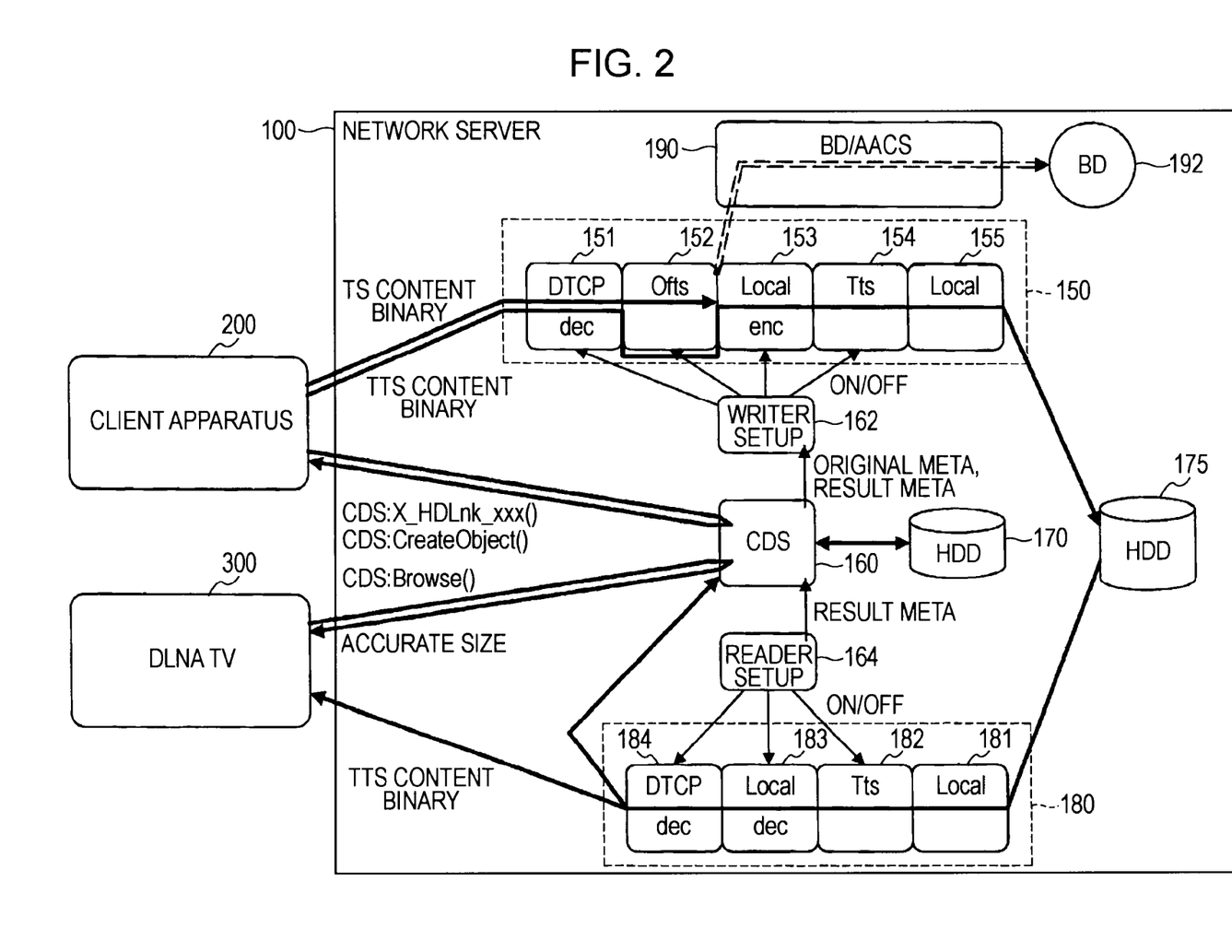
FIG. 2 is a block diagram illustrating a further detailed configuration example of a network server according to one embodiment of the invention.

FIG. 2 is a block diagram illustrating a further detailed configuration example of the network server according to one embodiment of the invention. FIG. 2 is a block diagram illustrating in more detail the function of the network Server 100 illustrated in FIG. 1. As illustrated in FIG. 2, the network Server 100, for example, includes a first pipeline converting unit 150, a Content Directory Service (CDS) unit 160 and a writer setup 162. Further, the network Server 100 includes a reader setup 164, a first Hard Disc Drive (HDD) 170 and a second Hard Disc Drive (HDD) 175. Furthermore, the network Server 100 includes a second pipeline converting unit 180, an AACS (Advanced Access Content System) encoding unit (BD/AACS) unit 190 and a Blu-ray disc writer (BD) 192.

The first pipeline converting unit 150 of FIG. 2 corresponds to the format converting unit 106 of FIG. 1. The first pipeline converting unit 150 includes a DTCP (Digital Transmission Content Protection) decoder (DTCP dec) 151 and a time stamp addition processor (Ofts) 152. Further, the first pipeline converting unit 150 includes a local encoder (Local enc) 153, a TTS writer-filter processor (Tts) 154, and a local storage writing processor (Local) 155. Each processing performed in the first pipeline converting unit 150 may be performed by a CPU/software processing, or a combination of hardware processing and the CPU/software processing. Normally, processes of the DTCP decoder 151, the time stamp addition processor 152 and the local encoder 153 are performed by integrated hardware in terms of robustness.

The DTCP decoder (DTCP dec) 151 performs a process of decoding content encoded based on DTCP standards. Herein, the DTCP denotes a technology of limiting the distance between two apparatuses capable of transmitting/receiving content data and realizing copyright protection. The distance is limited by applying a RTT (Round Trip Time) technology and setting an allowable value of a response time (RTTtime) between two apparatuses included in a home network.

The time stamp addition processor (Ofts) 152 performs a process of adding a time stamp to content with a partial single program TS format. Further, the time stamp addition processor 152 is not necessarily performed in the head of the first pipeline converting unit 150. For example, the time stamp addition processor 152 may be performed in the middle of the first pipeline converting unit 150.

The local encoder (Local enc) 153 performs a process of encoding content by using an encryption key generated based on unique information and the like of the network server 100. The TTS write-filter processor (Tts) 154 performs a process of relating to a time using a time stamp, such as time seek or a bit rate operation. The local storage writing processor (Local) 155 performs a process of writing content having passed the above processes on the HDD 175.

The Content Directory Service (CDS) unit 160, the writer setup 162 and the reader setup 164 of FIG. 2 correspond to the conversion determining unit 104 of FIG. 1.

The content directory service unit 160 manages an object such as an item and a container in a DLNA-defined network.

The writer setup 162 receives both the metadata of the content and the metadata of the content after conversion from the content directory service unit 160, and directs the first pipeline converting unit 150 to perform any one of conversion processes according to the metadata.

The reader setup 164 directs the second pipeline converting unit 180 to perform any one of conversion processes according to the metadata of the content provided from the content directory service unit 160.

The first Hard Disc Drive (HDD) 170 corresponds to the media format information storage unit 110 of FIG. 1. Further, the second Hard Disc Drive (HDD) 175 corresponds to the content storage unit 112 of FIG. 1. In FIG. 2, the first hard disc drive is configured separately from the second hard disc drive. However, the two hard disc drives may be provided as one hard disc drive.

The second pipeline converting unit 180 corresponds to the delivery unit 108 of FIG. 1. The second pipeline converting unit 180 includes a local reading processor (Local) 181, a TTS writer-filter processor (Tts) 182, a local decoder (Local dec) 183 and a DTCP decoder (DTCP dec) 184. Each processing performed in the second pipeline converting unit 180 may be performed by a CPU/software processing. Similarly to the case of the first pipeline converting unit 150, predetermined processes may be performed by integrated hardware.

The local reading processor (Local) 181 performs a process of reading data of content stored in the HDD 175. The TTS writer-filter processor (Tts) 182 performs a process of relating to a time using a time stamp, such as time seek or a bit rate operation.

The local decoder (Local dec) 183 performs a process of decoding content encrypted by the encryption key generated based on the unique information of the network server 100, and the like. The DTCP decoder (DTCP dec) 184 performs a process of decoding content encrypted based on DTCP standards.

The AACS encoding unit (BD/AACS) unit 190 obtains the content processed by the DTCP decoder 151 and the time stamp addition processor 152 to encode the content based on AACS standards. Further, the ARCS is copy protection standards for video content employed in a Blu-ray disc dedicated for reproduction.

The Blu-ray disc writer (BD) 192 obtains data of the encoded content from the AACS encoding unit (BD/AACS) 190 to write the data on a Blu-ray disc. When the content data is written on the Blu-ray disc by the Blu-ray disc writer (BD) 192, it is preferred to provide the AACS encoding unit (BD/AACS) unit 190 with the data of the content processed by the DTCP decoder 151 and the time stamp addition processor 152.

<4. Configuration of Client Apparatus that Uploads Content to Network Server According to One Embodiment of the Invention>

Next, the client apparatus 200 will be described. The client apparatus 200 includes a tuner such as a set-top box which converts cable television or digital broadcasting signals into signals which can be viewed on a television. For reasons of costs and the like, a case may occur in which such a client apparatus 200 has no function of automatically converting a media format of content, or specifications of the apparatus are determined according to the intention of venders or broadcast operators. Hereinafter, the detailed configuration example of the client apparatus will be described.

Figure 3:
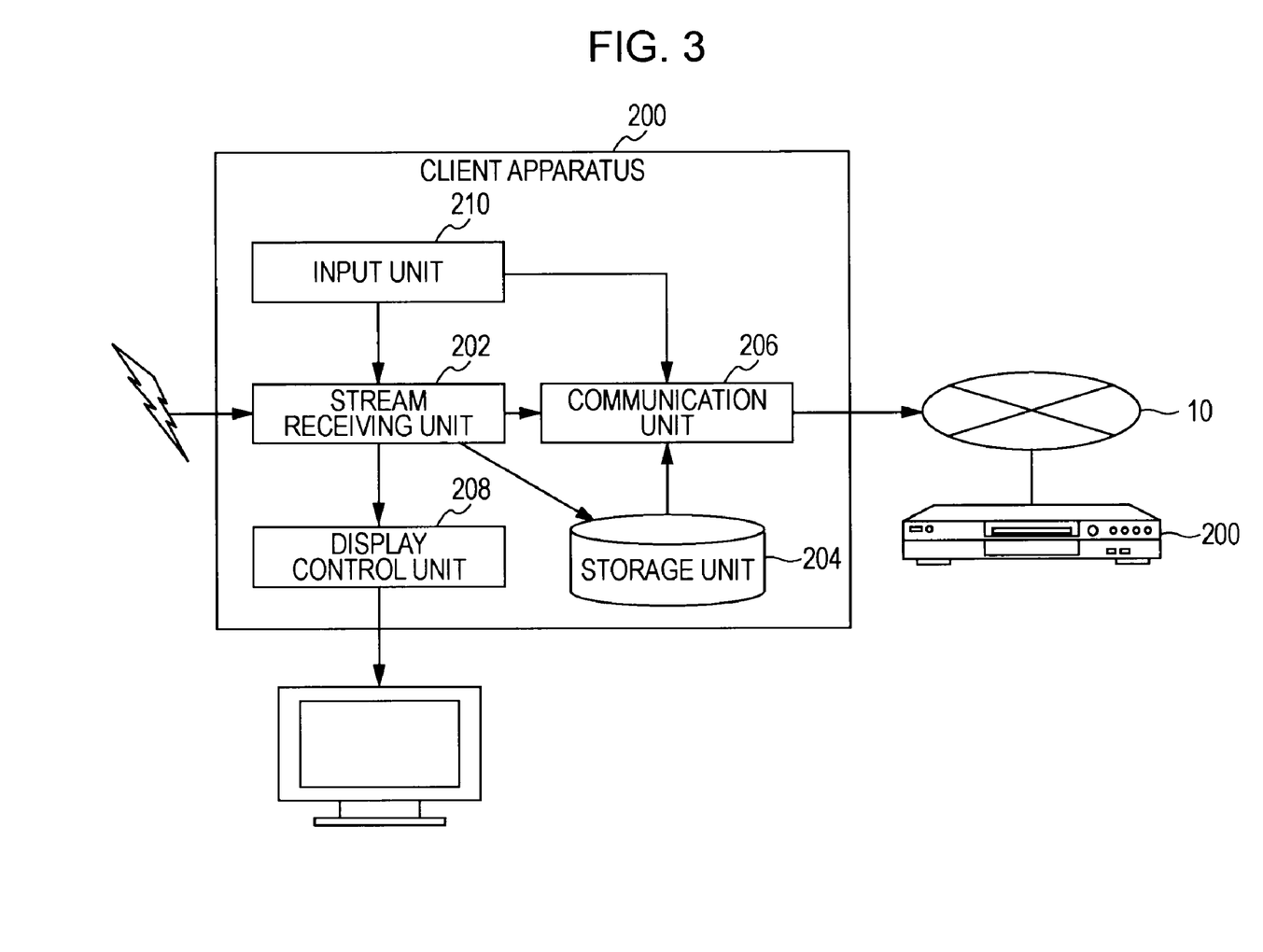
FIG. 3 is a block diagram illustrating a detailed configuration example of a client apparatus that uploads content to a network server according to one embodiment of the invention.

FIG. 3 is a block diagram illustrating a detailed configuration example of the client apparatus 200 that uploads content to the network server 100 according to one embodiment of the Invention. The client apparatus 200, for example, includes a stream receiving unit 202, a storage unit 204, a communication unit 206, a display controller 208 and an input unit 210.

The stream receiving unit 202 receives streams from a broadcast wave transmitted from a broadcast station and the like, and transmits video data obtained from the streams to the display controller 208. Further, the stream receiving unit 202 transmits received content to the network server 100 via the communication unit 206. Furthermore, the stream receiving unit 202 can allow received content to be stored in the storage unit 204.

The storage unit 204 stores the data of the content obtained in the stream receiving unit 202. Further, the communication unit 206 transmits the data of the content obtained in the stream receiving unit 202 or the data of the content stored in the storage unit 204 to the network server 100 via the network 10.

The display controller 208 controls the content obtained in the stream receiving unit 202 to be displayed on a display device connected thereto. Herein, the display device is directly connected to the client apparatus 200 by using an HDMI cable and the like, and is different from the display apparatus 300 connected to the network server 100 via a DLNA network and the like.

The input unit 210 includes an input section (e.g., a mouse, a keyboard, a touch panel, a button, a microphone, a switch and a lever) through which a user inputs information, and transmits a control signal for controlling operations of the stream receiving unit 202, the communication unit 206 and the like according to an input operation.

<5. Configuration of Display Apparatus that Receives Delivery of Content from Network Server>

Subsequently, the display apparatus 300 will be described. The display apparatus 300 receives delivery of content from the network server 100 via the DLNA network 11 and the like, and displays the content. Hereinafter, a detailed configuration example of the display apparatus 300 will be described.

Figure 4:
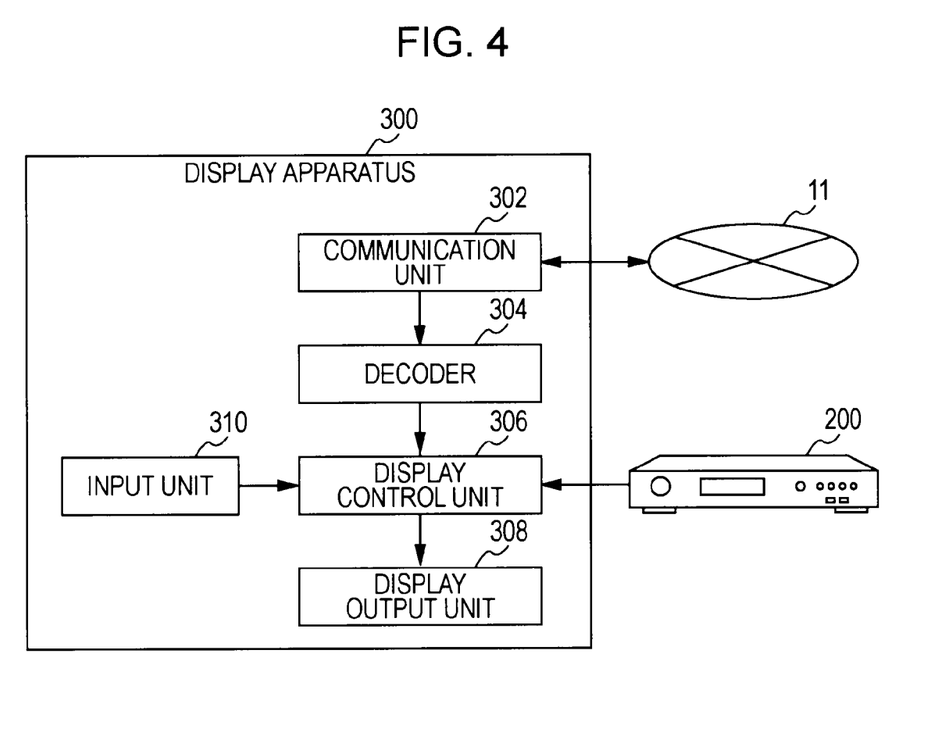
FIG. 4 is a block diagram illustrating a detailed configuration example of a display apparatus that receives delivery of content from a network server via a network according to one embodiment of the invention.

FIG. 4 is a block diagram illustrating a detailed configuration example of the display apparatus 300 that receives delivery of content from the network server via the network according to one embodiment of the invention. The display apparatus 300, for example, includes a communication unit 302, a decoder 304, a display controller 306, a display output unit 308 and an input unit 310.

The communication unit 302 performs bidirectional communication with respect to the network server 100 via the network 11. The communication unit 302 receives delivery of content from the network server 100.

The decoder 304 receives data of encoded content from the communication unit 302 to decode the data. Further, the decoder 304 provides the display output unit 308 with decoded image data via the display controller 306. Herein, the decoder 304 of the display apparatus 300 is normally limited in a decodable media format. Therefore, when the display apparatus 300 receives delivery of content from the network server 100 via the network, it is necessary to receive content at a media format which can be decoded by the decoder 304.

The display controller 306 controls video and voice data of the content delivered from the network server 100 to be displayed on the display output unit 308.

The display output unit 308, for example, includes a display device such as a CRT (Cathode Ray Tube) display device, a Liquid Crystal Display (LCD) device and an OLED (Organic Light Emitting Diode). The display output unit 308 displays the video and voice data of the content under the control of the display controller 306.

The input unit 310 serves as a device for receiving input of instructions used when a user operates the display apparatus 300, and transmits an electric signal for controlling the operation of the display apparatus 300 to each element according to the instructions input by the user.

<6. Detailed Example of Hardware Configuration of Network Server According to One Embodiment of the Invention>

Subsequently, a hardware configuration of the network server 100 according to one embodiment of the invention will be described. The network server 100 according to one embodiment of the invention is realized by the hardware configuration illustrated in FIG. 5.

Figure 5:
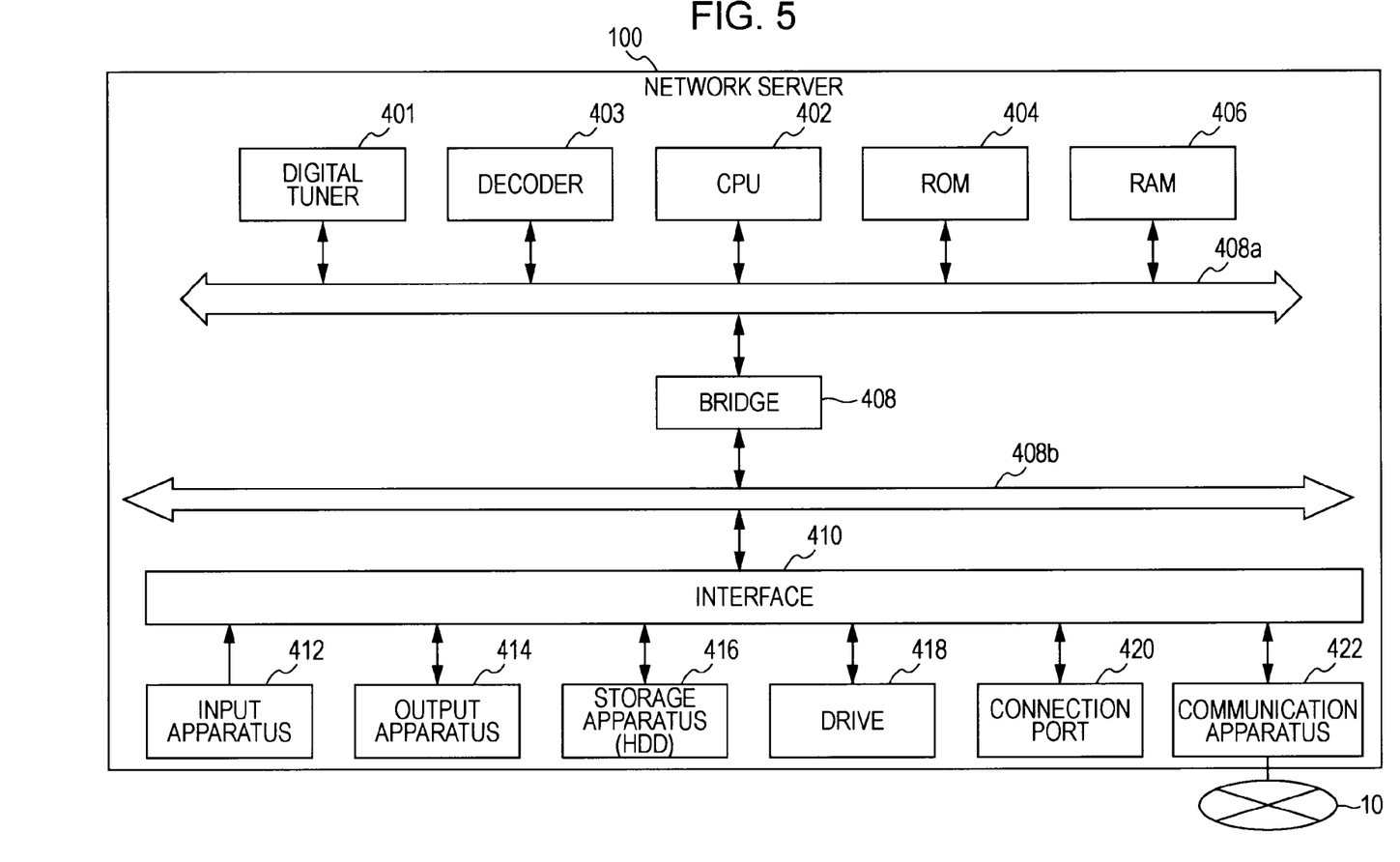
FIG. 5 is a block diagram illustrating a configuration example of hardware of a network server according to one embodiment of the invention.

The network server 100 includes a digital tuner 401, a CPU (Central Processing Unit) 402 and a decoder 403. Further, the network server 100 includes a ROM (Read Only Memory) 404, a RAM (Random Access Memory) 406 and a host bus 408a. Furthermore, the network server 100 includes a bridge 408, an external bus 408b, an interface 410, an input device 412, a storage device (HDD) 414, a drive 416, a connection port 418 and a communication device 420.

The digital tuner 401 processes a broadcast wave to obtain a predetermined transport stream. For example, in the case of digital broadcasting, the digital tuner 401 receives a broadcast wave signal sent from a digital antenna and converts the broadcast wave signal into an MPEG2-TS (MPEG2 Transport Stream). The digital tuner 401 is not illustrated in FIGS. 1 and 2.

The CPU 402 serves as an operation processor and a controller to control the general operation of the network server 100 according to various programs. Further, the CPU 402 may be prepared in the form of a microprocessor. The ROM 404 stores programs, operation parameters and the like, which are used by the CPU 402. The RAM 406 temporarily stores programs used for the execution of the CPU 402, parameters appropriately changed according to the execution of the CPU 402, and the like. The ROM 404 is connected to the RAM 406 through the host bus 408a including a CPU bus and the like. The CPU 402 performs the functions of the conversion determining unit 104, the format converting unit 106, the delivery unit 108 and the like of FIG. 1 by executing programs stored in the storage device 414 and the like.

The decoder 403 receives the MPEG2-TS sent from the digital tuner 401, converts a voice signal in the MPEG2-TS into a digital voice signal and converts a video signal in the MPEG2-TS into a digital component signal. The decoder 403 is not illustrated in FIGS. 1 and 2.

The host bus 408a is connected to the external bus 408b such as a PCI (Peripheral Component Interconnect/Interface) bus through the bridge 408. The host bus 408a, the bridge 408 and the external bus 408b are not necessarily separated from each other. For example, the functions of the host bus 408a, the bridge 408 and the external bus 408b may be mounted on one bus.

The input device 412 includes an input section (e.g., a mouse, a keyboard, a touch panel, a button, a microphone, a switch and a lever) through which a user inputs information, an input control circuit that generates an input signal based on input by a user to output the input signal to the CPU 402, and the like. The input device 412 can input various pieces of data to the network server 100 or direct a processing operation to the network server 100. The input device 412 corresponds to the input unit 210 of FIG. 1.

The storage device 414 may include a storage medium, a recording device for recording data on the storage medium, a reading device for reading the data from the storage medium, and a delete device for deleting the data recorded on the storage medium. The storage device 414, for example, includes an HDD (Hard Disk Drive). The storage device 414 drives a hard disk and stores programs executed by the CPU 402 or various pieces of data. The storage device 414 corresponds to the media format information storage unit 110 and the content storage unit 112 of FIG. 1, or the HDD 170 and the HDD 175 of FIG. 2.

The drive 416 serves as a reader/writer for a storage medium. The drive 416 is embedded in the network server or is provided to an external portion thereof. The drive 416 can perform a reading and writing operation of data with respect to a magnetic disk, an optical disk or a magneto-optical disk, which is mounted thereon, or a removable storage medium such as a semiconductor memory. The drive 416 corresponds to the writer 114 of FIG. 1 or the Blu-ray disc writer 192 of FIG. 2.

The connection port 418 serves as an interface connected to an external device, and is for example prepared in the form of a connection opening for connection to an external device capable of transmitting data through HDMI. Further, the communication device 420, for example, serves as a communication interface for connection to the communication network 10, which includes a communication device and the like. Further, the communication device 420 may be a wireless LAN (Local Area Network)-compliant communication device, a wireless USB-compliant device apparatus, or a wired communication device for performing wired communication. The connection port 418 and the communication device 420 are used for realizing the communication functions of the receiving unit 102 and the delivery unit 108 of FIG. 1, or the first pipeline converting unit 150 and the second pipeline converting unit 180 of FIG. 2.

The client apparatus 200 is also realized by the hardware configuration illustrated in FIG. 4.

<7. Base Technology of Network Server and Client Apparatus>

Subsequently, before the flow of the media format conversion performed in the network server 100 is described in detail, the base technology of the network server 100 and the client apparatus 200 will be described in detail. In the following description, the client apparatus 200 will be referred to as a STB/PVR. The STB is the abbreviation for a set-top box and the PVR is the abbreviation for a personal video recorder.

Due to the intention of a broadcast operator and a STB/PVR vender for low price sale or rental of the STB/PVR, demands for the cost of the STB/PVR become strong. In this regard, it is desired that a media format which is the most similar to a format used for their own broadcasting is selected as a media format when uploading content to the network server from the STB/PVR. As for the media format which is the most similar to a format used for their own broadcasting, for example, an MPEG-2 (ISO13818-2) format is used for video. Further, for example, packetizing an H.264AVC format into a TransferStream (hereinafter, referred to as TS) format defined by an MPEG-2 system layer (ISO13818-1) is used. In addition, it is desired that the client apparatus (e.g., the STB/PVR) uploads content deliverable from a digital tuner and the like in real-time to the network server in real-time.

To this end, a hardware configuration of a CPU and the like of the STB/PVR has a high specification in order to perform media format conversion in real-time so as to be adapted for a media format receivable in the network server, resulting in an increase in costs. The STB/PVR extracts one (in terms of standards, or denoted as the plural) program from a full TS stream including a plurality of programs used for the broadcasting, and employs the extracted program as single program TS. In addition, the STB/PVR uploads content to the network server, the content being referred to as a non-time-stamped TS format and being employed as a partial TS obtained by converting a SI/PSI information packet so as to be adapted for a format defined by ARIB STD B21 or DVB. The media format is described as Mime-type=Video/mpeg, Profile-name=MPEG_TS_HD_EU_ISO and the like in relation to metadata. Moreover, a media format, in which the above media format is subject to DTCP-IP (Data Transmission Content Protection over Internet Protocol) copyright protection, is described as Mime-type=application/x-dtcpl; CONTENTFORMAT=video/mpeg, Profile-name=PEG_TS_HD_EU_ISO and the like.

Compared to this, a time-stamped TS format, in which a 4-byte time stamp is added to a partial single program TS, is generally used in a DLNA-compliant television and the like. The time-stamped TS format, for example, is defined by ARIB STD B21 and the like. Due to the existence of packet-level time axis information in the case of non-real-time transmission and high jitter transmission over an IP network and the like, or decoding of a stream having passed through a storage and the like, a transmission amount to a decoder can be controlled in units of a packet. The media format is described as Mime-type=video/vnd.hdlnk.mpeg-tts, Profile-name=MPEG_TS_HD_EU_T and the like in relation to metadata. In addition, a media format, in which the above media format is subject to DTCP-IP copyright protection, is described as Mime-type=application/x-dtcp1; CONTENTFORMAT=Video/vnd.hdlnk.mpeg-tts, Profile-name=MPEG_TS_HD_EU_T and the like.

<8. Flow of Media Format Conversion in Network Server According to One Embodiment of the Invention>

Figure 6:
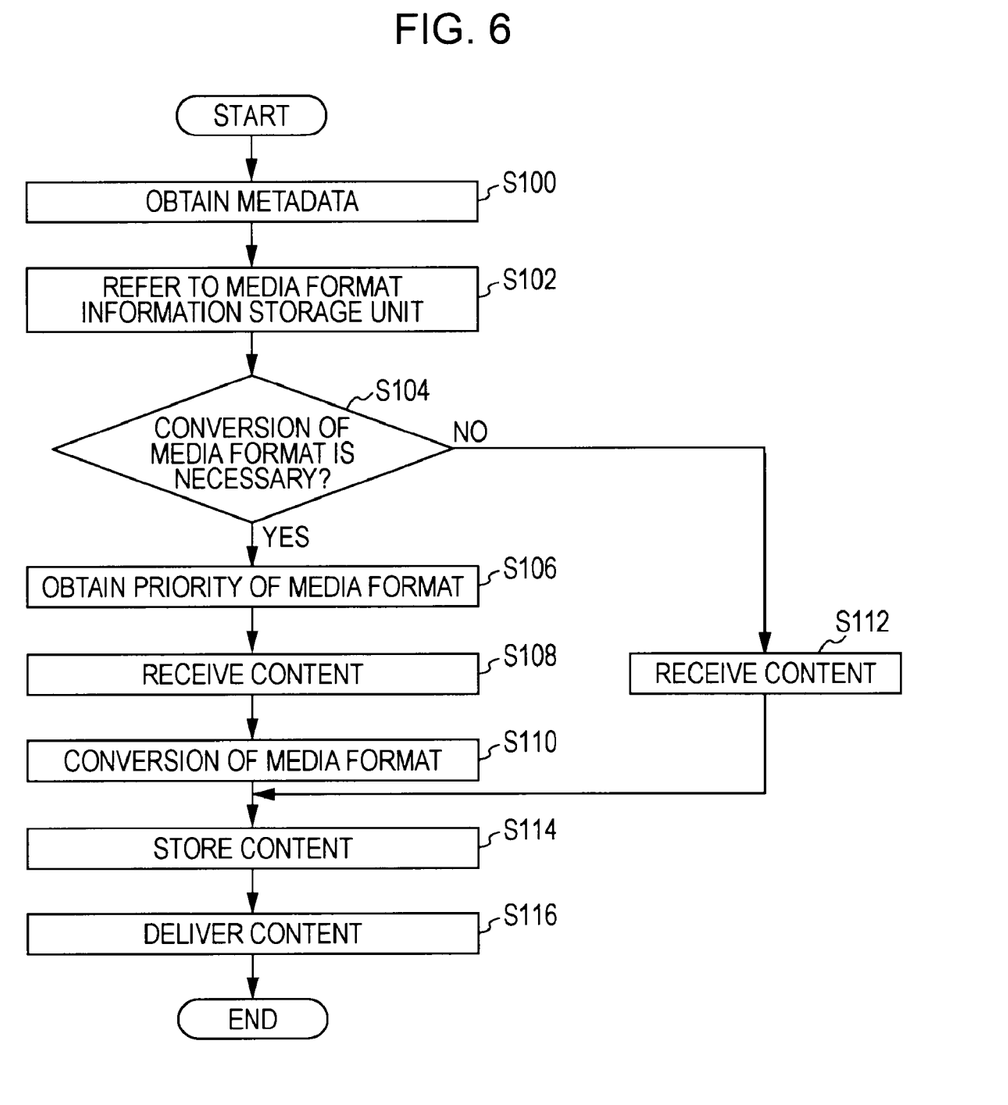
FIG. 6 is a flowchart illustrating one example in which a network server converts a media format according to one embodiment of the invention.

Subsequently, the flow of a process in which the network server 100 converts a media format of content according to one embodiment of the invention will be described with reference to FIG. 6. FIG. 6 is a flowchart illustrating one example of the flow in which the network server 100 converts a media format of content according to one embodiment of the invention.

<Media Format Conversion 1>

The conversion determining unit 104 obtains metadata of content from the client apparatus 200 on the assumption that the receiving unit 102 receives the content from the client apparatus 200 (Step S100). The conversion determining unit 104 obtains a list of media formats calling for media format conversion with reference to the media format information storage unit 110 (Step S102). The conversion determining unit 104 determines whether it is necessary to convert the media format of content based on the obtained list of the media formats and the metadata of the content (Step S104).

When it is determined that the media format conversion is necessary in Step S104, the conversion determining unit 104 obtains information on a priority of a media format to be selected as a media format after the conversion from the media format information storage unit 110 (Step S106). The conversion determining unit 104 decides the media format after the conversion according to the information on the priority, and notifies the receiving unit 102 and the format converting unit 106 of the decided media format. Then, the receiving unit 102 receives content from the client apparatus 200 (Step S108) and provides the received content to the format converting unit 106. The format converting unit 106 converts a media format of the content into the media format decided by the conversion determining unit 104 (Step S110).

Meanwhile, when it is determined that the media format conversion is not necessary in Step S104, the conversion determining unit 104 informs the receiving unit 102 of the fact that the media format conversion is not necessary, and the receiving unit 102 receives content from the client apparatus 200 (Step S112). At this time, the format converting unit 106 does not perform the media format conversion.

The content storage unit 112 stores the content data obtained in Steps S110 and S112 (Step S114). Thereafter, the delivery unit 108 delivers the content stored in the content storage unit 112 to the display apparatus 300, which is connected through the network 11, at the request of the display apparatus 300 (Step S116).

Figure 7:
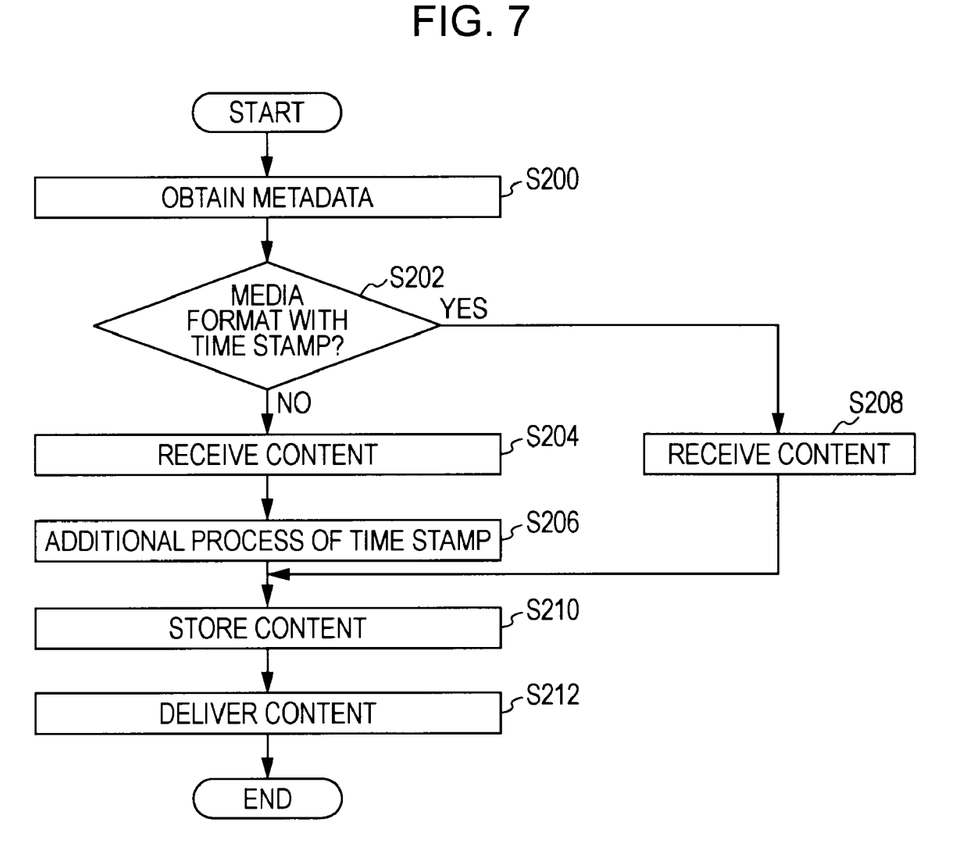
FIG. 7 is a flowchart illustrating one example in which a network server converts a media format according to one embodiment of the invention.

Subsequently, the flow of a process in which the network server 100 converts a media format of content according to one embodiment of the invention will be described with reference to FIG. 7. FIG. 7 is a flowchart illustrating one example of the flow in which the network server 100 converts a media format of content according to one embodiment of the invention.

<Media Format Conversion 2>

The conversion determining unit 104 obtains metadata of content from the client apparatus 200 on the assumption that the receiving unit 102 receives the content from the client apparatus 200 (Step S200). The conversion determining unit 104 determines whether the content received from the client apparatus 200 has a media format with a time stamp based on the obtained metadata (Step S202).

When it is determined that the content received from the client apparatus 200 has a media format with no time stamp in Step S202, the conversion determining unit 104 notifies the receiving unit 102 and the format converting unit 106 of the determination result. Then, the receiving unit 102 receives content from the client apparatus 200 (Step S204) and the format converting unit 106 performs a time stamp addition process with respect to the content received from the client apparatus 200 (Step S206).

When it is determined that the content received from the client apparatus 200 has a media format with a time stamp in Step S202, the conversion determining unit 104 notifies the receiving unit 102 and the format converting unit 106 of the determination result. Then, the receiving unit 102 receives content from the client apparatus 200 (Step S208), and the content is stored in the content storage unit 112 without being subject to the time stamp addition process (Step S210).

Thereafter, the delivery unit 108 reads the content stored in the content storage unit 112 at the request of the display apparatus 300 and delivers the content to the display apparatus 300 connected through the network 11 (Step S212).

The network server 100 can accept the upload of both the time-stamped TS format and the non-time-stamped TS format by performing the time stamp addition process as described above. That is, the network server 100 converts content of the non-time-stamped TS format into content of the time-stamped TS format and delivers the converted content, thereby realizing superior connection to an existing DLNA-compliant television which corresponds to the display apparatus 300. Thus, a gap in media formats between the client apparatus 200 and the network server 100 can be removed, and compatibility with a wide variety of STB/PVRs is achieved. As described above, the time-stamped TS format is obtained by adding a 4-byte time stamp to the partial single program TS, and is generally used for the existing DLNA-compliant television and the like which corresponds to the display apparatus 300.

Herein, the network server 100 receives a stream of the non-time-stamped TS format and simultaneously adds a time stamp based on real-time information or PCR information of a TS stream, and immediately converts the non-time-stamped TS format into the time-stamped TS format. This will be referred to as an on-the-fly time stamping. Otherwise, after the network server 100 accumulates content in a storage, the delivery unit 108 may perform conversion processing equal to the above processing (hardware processing or CPU/software processing).

In addition, the network server 100 performs transcoding of a video stream or an audio stream to adapt a coding layer of audio or video to BD standards. At this time, the network server 100 may add a time stamp adapted for the BD standards. The time stamp adapted for the BD standards can be easily converted because its format is slightly different from the time-stamped TS format. The network server 100 can perform this conversion simultaneously with decoding processing of a stream subject to link protection using DTCP-IP and the like for copyright protection, re-encryption in the storage to a local storage, and the like.

<9. Information Flow between Network Server and Client Apparatus in Media Format Conversion Work>

Figure 8:
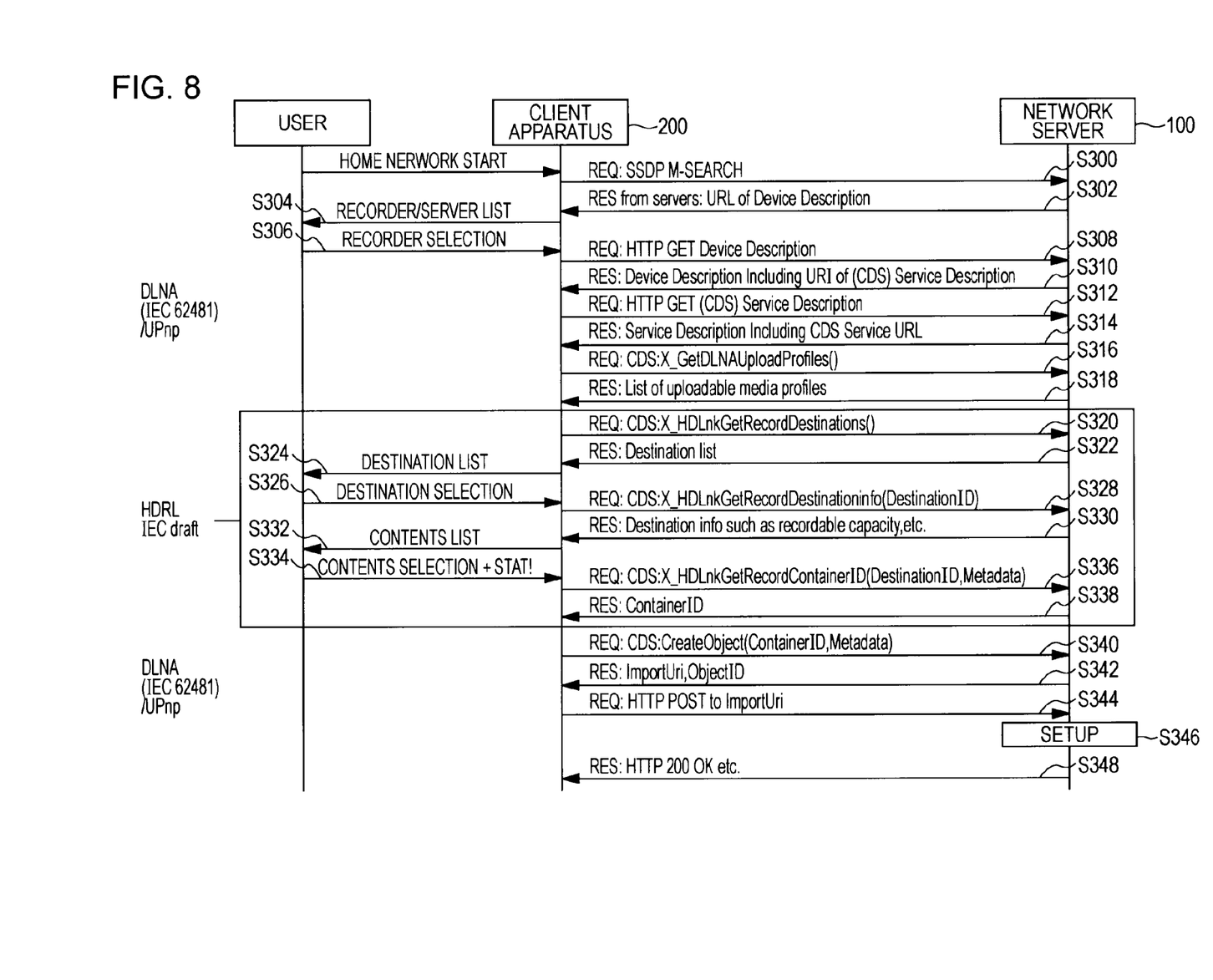
FIG. 8 is a sequence diagram illustrating the flow of information exchange between a network server and a client apparatus in media format conversion work.

Subsequently, information flow between the network server 100 and the client apparatus 200 in media format conversion work will be described with reference to FIG. 8. FIG. 8 is a sequence diagram illustrating one example of information flow between the network server 100 and the client apparatus 200.

First, a user interactively selects content to be uploaded, a device and a drive (BD, HDD and the like) serving as an upload destination through a user interface of the client apparatus 200 by using a remote controller (Steps S300 to S338). In this process, a network connection is established between the client apparatus 200 and the network server 100 by a method defined by HDRL, DLNA or UPnP. Before uploading content to the network server 100, the client apparatus 200 issues a CDS:X_GetDLNAUploadProfiles request (Step S316). In response to the request, the network server 100 notifies the client apparatus 200 of a Profile-name which can be treated by the server (Step S318). In response to the CDS: X_GetDLNAUploadProfiles request from the client apparatus 200, the network server 100 sends a response indicating that the network server 100 accepts both MPEG_TS_H-D_EU_ISO and MPEG_TS_HD_EU_T (Step S318). Herein, when accepting the upload of content of the time-stamped TS format, the network server 100 automatically determines the necessity of a conversion such as time stamp addition and does not perform the time stamp addition because the conversion such as the time stamp addition is not necessary.

In relation to the selection of the content to be uploaded and the upload destination, first, a STB/PVR serving as the client apparatus 200 finds out BD recorders or other servers serving as the network server 100 (Steps S300 and 302). Next, the client apparatus 200 provides a user with a list of the recorders or the servers (Step S304). The user selects one server from the provided list (Step S306). The STB/PVR serving as the client apparatus 200 obtains a list of drives or related information from the selected network server 100 (Steps S308 to S318), and provides the user with the list or the related information (Step S324). The user selects one drive and also selects content to be uploaded in the client apparatus 200 (Steps S326 and S334). The client apparatus 200 transmits metadata of the selected content and an ID of the selected drive to the network server 100 (Step S336). Then, the network server 100 notifies the client apparatus 200 of a container ID in the drive (Step S338). Further, in FIG. 8, according to one example of a method of providing the information to the user, the information is displayed on a display apparatus and the like, which is connected to the display controller 208 of the client apparatus 200.

The communication performed in Steps S320 to S336 can be performed via an HDRL-defined network. Further, the communication performed in other steps can be performed via a DLNA-defined network.

Herein, in the HDRL-defined network, the client apparatus 200 and the network server 100 exchange information related to drive selection through CDS action additionally defined. In response to a CDS:CreateObject request of the client apparatus 200, the network server 100 generates a value of res@importURI of a response. At this time, the network server 100 creates a comparison table of URI and drive selection information by allowing the drive selection information to be included in the URI with reference to the ContainID of the CDS:CreateObject request. Through the above CDS action, the client apparatus 200 and the network server 100 can exchange information and the like related to the drive selection.

Before uploading a content binary to the network server 100, the client apparatus 200 issues the CDS:CreateObject request to create an object in a CDS serving as a metadata database (Step S340). At this time, the client apparatus 200 designates metadata of content by an Elements input argument. A value of the Elements input argument is an XML document having a schema referred to as DIDL-Lite. The client apparatus 200 designates the Mime-type and the Profile-name in a third field and a fourth field of a character string which is a value of ProtocolInfo attribute of an element of the XML document. The client apparatus 200 makes an HTTP POST request (Step S344). If the network server 100 accepts the request, the network server 100 is set up (Step S346). Then, the network server 100 notifies the client apparatus 200 of the acceptance of the content upload (Step S348).

Herein, when requesting the CDS:CreateObject and the like (Step S340), the client apparatus 200 designates ProtocolInfo coinciding with a content stream during the upload of the client apparatus 200. When uploading content in the non-time-stamped TS format, the client apparatus 200 designates a media format described as Mime-type=Video/mpeg, Profile-name=MPEG_TS_HD_EU_ISO in ProtocolInfo, and makes the CDS:CreateObject request. When receiving the CDS:CreateObject request, the network server 100 receives the Mime-type and the Profile-name until returning a response. The network server 100 determines any one of (1) reception without conversion, (2) reception after conversion and (3) non-reception by using the Mime-type and the Profile-name as a key from table reference, condition determination and the like. In the case of (2), a CDS 160 obtains a Mime-type and a Profile-name after conversion, reference of a conversion module, reference of a size estimation module and the like. The network server 100 recreates ProtocolInfo based on the Mime-type and the Profile-name after conversion. When a size before conversion is designated, the network server 100 calculates an estimation size after conversion based on the Mime-type and the Profile-name before and after conversion or the reference of the size estimation module. The estimation size after conversion is reflected in res@size attribute of a Result output argument of a CDS::CreateObject response. Treatment of a size will be described in detail later.

<10. Treatment of Metadata in Network Server 100>

The network server 100 allows information on the size to be stored in the HDD 170 as metadata of an object, which is managed by the CDS 160. Further, the network server 100 allows the Mime-type and the Profile-name before conversion, the reference of the conversion module, the reference of the size estimation module and the like to be stored in the HDD 170 in connection with a corresponding object in the CDS 160. In order to cope with trace reproduction which represents delivery before the completion of upload, the CDS 160 immediately may generate a delivery URL by using a text value. The CDS 160 decides an entity (drive or directory) of a storage serving as an upload destination of a content binary from the metadata and the like, and generates a value of res@importURI which is to be the URL. Thereafter, the CDS::CreateObject response is returned. Differently from the related art, metadata of ProtocolInfo and the like is different in values of the input argument of the CDS::CreateObject request and the Result output argument of the response. However, in DLNA standards, a media server can correct the metadata.

Meanwhile, various formats are used as media formats according to each standard of HDRL, DLNA, UPnP and ARIB, or the difference of countries or broadcast media. However, the above standards coincide with each other in that media formats of content are identified by the Mime-type and the Profile-name. The Mime-type and the Profile-name are included in a third field and a fourth field of a character string referred to as ProtocolInfo. In many cases, a network media server corrects a content size, address information and the like with respect to metadata received from a client apparatus, records a media format almost as it is, and responds to a subsequent CDS:Browse request. Compared to this, according to the embodiment, the whole or a part of the content binary is recorded on the HDD 175, the Blu-ray disc writer 192, a buffer memory (not shown) and the like of the network server 100 together with the upload as described above.

(Operation of Network Server 100 after Upload of Content is Started)

If the upload of the whole or a part of the content binary is successful, the network server 100 can deliver the uploaded content via a network. The DLNA-compliant television corresponding to the display apparatus 300 can issue the CDS:Browse request, and obtain a content list in the server and metadata thereof by the Result output argument of the response thereof. A value of the Result output argument is an XML document having a schema which is equal to that of Elements, and the Mime-type and the Profile-name are shown in a third field and a fourth field of a character string which is a value of ProtocolInfo attribute of an element of the XML document.

In addition, in the case of the start of reception of the content binary upload, the network server 100 can decide a media conversion policy which is equal to that in the case of the reception of the CDS::CreateObject request (Step S340). The content binary upload is generally performed by an HTTP POST method, and in the DLNA standards, a Mime-type is shown in a Content-Type header and a Profile-name is shown in a contentFeatures.dlna.org header. Further, table search is possible by using them as the Mime-type and the Profile-name before conversion. However, in the case in which the contentFeatures.dlna.org header is an option in standards, when the Profile-name is not necessarily obtained, the above method may not be available. For this reason, it may be possible to use a path which is shown in an HTTP POST request line and respond to a value of res@importURI returned when a CDS:CreateObject response is accomplished. The client apparatus 200 and the display apparatus 300 can make inquiries to the CDS management function (CDS 160) in the network server 100 by using the value of res@importURI as a key. Consequently, reference of the created object and information stored in connection with the reference are obtained.

Further, as another method, the network server 100 may encode information necessary for the subsequent upload so as to be filled in a query character string of res@importURI at the time point at which the CDS:CreateObject response is generated. When accepting the content upload, the network server 100 can obtain necessary information by extracting a query part from the path of the POST request line received from the client apparatus 200 and decoding the same. When uploading the content binary, it is necessary for the network server 100 to select the use or disuse of the conversion module or other processing. The selection can be accomplished from the conversion module reference or the Mime-type and the Profile-name after conversion and the like.

Hereinafter, implementation of obtaining the Mime-type and the Profile-name described in the metadata before and after conversion and selecting a media format before and after conversion, and the process (Open process) of the network server 100 at the start point of the upload of the content binary will be described.

(Media Conversion Process of First Pipeline Converting Unit 150)

A process in which the network server 100 receives the content binary from the client apparatus 200 via a network and stores the same includes the stack of a plurality of writer-filter class objects (the first pipeline converting unit 150). A filter may be pure software, or may include hardware or a device drive. For the first time, a local storage writer class object is unconditionally created by the most storage.

Next, when the Mime-type and Profile-name after conversion corresponds to the time-stamped TS format, a TTS filter writer class object (Tts 154) is stacked. A process associated with a time using a time stamp, such as time seek or bit rate operation, is performed. Then, when DTCP-IP content and content before conversion correspond to the partial single program TS, DTCP-IP filters (the DTCP dec 151 and the Ofts 152) having a time stamp addition function are stacked. When the DTCP-IP content and the content before conversion correspond to the time-stamped TS, the DTCP-IP filter (the DTCP dec 151) having no time stamp addition function is stacked. When non-DTCP-IP content and the content before conversion correspond to the partial single program TS, the filter (the Ofts 152) performing only the time stamp addition is stacked. When the non-DTCP-IP content and the content before conversion correspond to the time-stamped TS, nothing is stacked. These filters perform the conversion process in a pipeline manner, so that a format on a network is finally converted into a format on a storage. Data of the content with the converted media format is preserved in a local storage. In addition, in the network server 100 such as a BD recorder having both the HDD and the BD, the selection of a storage destination is accomplished separately from the selection based on the media format.

It is determined whether the above processes performed by the filters are used by the writer setup 162 (on/off of FIG. 2) according to the metadata before media format conversion, the metadata after media format conversion and the like, which are provided from the CDS 160. Further, it is determined whether the filter process in the second pipeline converting unit 180 is used by the reader setup 164 (on/off of FIG. 2) according to the metadata and the like of the content preserved in the HDD 175. The reader setup 164 notifies the CDS 160 of the metadata after conversion of the content converted by the second pipeline converting unit 180.

The DTCP-IP process (the DTCP dec 151) and the time stamp addition (the Ofts 152) are separated from each other as filters, so that decoding for copyright protection, time stamp addition and local encryption can be performed by integrated hardware, resulting in the achievement of robustness. Implementation in which each part is divided into a different filter, implementation only by software and the like may be permitted. Further, the time stamp addition is not necessarily performed in the head of the process pipeline. For example, the time stamp addition may be performed in the middle thereof.

Before conversion, in the case of the DTCP-IP and the partial single program TS, a media format, for example, is described in metadata as Mime-type=application/x-dtcp1; CONTENTFORMAT=Video/mpeg, Profile-name=MPEG_TS_HD_EU_ISO and the like. Content with the media format expressed by the metadata is processed in the sequence of the decoding process of DTCP-IP (DTCP dec 151), the time stamp addition process (the Ofts 152) and the local encryption process (Local enc 153). In addition, content is processed in the sequence of the TTS writer filter process (Tts 154) and the local storage writing processor (Local 155). Therefore, content with the media format expressed by the metadata is converted in a media format described in metadata as Mime-type=application/x-dtcp1; CONTENTFORMAT=video/vnd.hdlnk.mpeg-tts, Profile-name=MPEG_TS_HD_EU_T.

(Treatment of Information on Network Domain Size of Content)

Hereinafter, the treatment of information on a network domain size of content in the CDS 160 will be described as follows. In relation of the treatment of a size, res@size represents a payload byte number (network domain size) on a network, and is defined by DLNA and the like. When there exists res@size designation at the CDS:CreateObject request, the CDS 160 can estimate a size after conversion by using the size estimation module at that time point.

However, the above value may be corrected later by the following reasons. When a value other than a chunked value is designated in the Content-Length header when the network server 100 starts the reception of the upload, size estimation may be performed so as to be reflected in the res@size. In addition, it is necessary that a value and the like shown in the Content-Length of an HTTP GET response during delivery coincides with the Body size actually transmitted at a request of an HTTP protocol. In spite of this, until the upload is completed, an unknown parameter exists, and a size or a conversion parameter is not fixed in a strict sense. For example, even when there is no media format conversion, it is desired that the network domain size is changed during the upload and the delivery through the DTCP-IP process (DTCP dec 151) for the PCP length (LEN) dynamically changed.

Further, in the case in which the res@size is not designated at the CreateObject and in the case of the Content-Length: chunked at the start of the upload, if the upload is not actually completed, the network server 100 does not recognize the content size. Thus, a case may occur in which update of update res@size is necessary after the completion of the upload. In addition, when the network server 100 receives seek requirement by an HTTP GET request with a range header, precise calculation for a size is necessary, including a process such as decoder friendliness. In this way, the size conversion module when the upload is completed or the delivery is performed is mounted as one method of a reader filter class that performs a process opposite to that of the writer filter, separately from the estimation module used at the CDS:CreateObject and the like. Consequently, the CDS 160 can obtain an accurate size in such a manner that the CDS 160 converts a size for each stacked reader filter based on an actual storage size. In the case of receiving the HTTP GET request from the display apparatus 300 before the upload is completed as with the trace reproduction and the like, the network server 100 may send a response to the display apparatus 300 based on the received size. Otherwise, it is desired that the network server 100 sends a response through chunked encoding as Content-Length:chunked.

In the network server of the invention, it is possible to preserve both the content before conversion and the content after conversion. In such a case, it is desired to use a method of using a plurality of resources (corresponding to the <res> element in the CDS), or generating an additional container or item. Further, implementation of performing on-the-fly media conversion has been shown. However, content uploaded in an original media format can be subject to media format conversion in off-line.

As described above, according to the network server 100 according to one embodiment of the invention, advantages of (1) and (2) are obtained. (1) Distribution of functions can be freely performed according to the cost strategy of the client apparatus 200 such as the PVR/STB and the network server 100 (media server) such as the BD recorder. (2) Decision of a media format is possible according to strategy, such as selecting of a media format with superior compatibility in relation to the delivery from the network server 100.

The present application contains subject matter related to that disclosed in Japanese Priority Patent Application JP 2009-102102 filed in the Japan Patent Office on Apr. 20, 2009, the entire content of which is hereby incorporated by reference.

In the above description, a preferred embodiment of the invention has been described in detail with reference to the accompanying drawings. However, the invention is not limited thereto. It should be understood by those skilled in the art that various modifications, combinations, sub-combinations and alterations may occur depending on design requirements and other factors insofar as they are within the scope of the appended claims or the equivalents thereof.

For example, in the above embodiment, the HDRL and DLNA-defined networks has been described. However, the invention is not limited thereto.

What is claimed is:

1. A network server comprising:
   a receiving unit that receives content from a client apparatus connected via a first network;
   a conversion determining unit that
      obtains metadata of the content to determine whether to convert a first media format of the content according to the metadata, and
      selects a second media format according to the metadata when a determination is made to convert the first media format; and
   a format converting unit that converts, via a processor, the first media format of the content into the second media format selected by the conversion determining unit.

2. The network server according to claim 1, wherein the conversion determining unit obtains the metadata from the client apparatus in response to the receiving unit receiving the content.

3. The network server according to claim 1, further comprising:
   a delivery unit that delivers the unconverted content received from the client apparatus or the content converted by the format converting unit to a display apparatus connected via a second network.

4. The network server according to claim 1, further comprising:
   a media format information storage unit that stores information on media format priority,
   wherein the conversion determining unit selects the second media format based on the media format priority.

5. The network server according to claim 4, wherein, when the media format of the content has no time stamp, the conversion determining unit selects a media format with a time stamp added thereto as the second media format.

6. The network server according to claim 1, wherein
   the client apparatus communicates with the receiving unit via a DLNA (Digital Living Network Alliance)-defined network, and
   the conversion determining unit determines whether to convert the first media format based on protocol information designated by an input argument of a CDS:CreateObject request transmitted from the client apparatus.

7. The network server according to claim 1, wherein the receiving unit obtains data of the content according to an HTTP POST request transmitted from the client apparatus.

8. A media format conversion method comprising:
   obtaining metadata of content from a client apparatus connected via a network;
   determining whether to convert a first media format of the content according to the metadata;
   selecting a second media format according to the metadata when a determination is made to convert the first media format;
   receiving the content from the client apparatus; and
   converting, via a processor, the first media format of the content to the selected second media format.

9. A media format conversion system comprising:
   a network server including
      a receiving unit that receives content from a client apparatus connected via a first network,
      a conversion determining unit that
         obtains metadata of the content to determine whether to convert a first media format of the content according to the metadata and
         selects a second media format after conversion according to the metadata when a determination is made to convert the first media format, and
      a format converting unit that converts the first media format of the content into the second media format selected by the conversion determining unit;
   the client apparatus that transmits the content to the network server via the first network; and
   a display apparatus that receives the content, which is converted by the format converting unit, from the network server via a second network.

\* \* \* \* \*